United States Patent
Clarke

[19]

[11] Patent Number: 6,164,009
[45] Date of Patent: Dec. 26, 2000

[54] DEVICE FOR TRAPPING PESTS

[76] Inventor: Thomas Emerson Clarke, 471045 A-Line, R.R. #2, Orangeville, Ontario, Canada, L9W 2Y9

[21] Appl. No.: 09/173,541

[22] Filed: Oct. 16, 1998

[51] Int. Cl.[7] .................................................. A01M 1/10
[52] U.S. Cl. .............................. 43/107; 43/122; 43/132.1
[58] Field of Search .................... 43/107, 114, 113, 43/122, 131, 132.1, 64, 58, 124

[56] References Cited

U.S. PATENT DOCUMENTS

| | | |
|---|---|---|
| 573,587 | 12/1896 | Freeman . |
| 1,124,642 | 1/1915 | Nye . |
| 1,448,098 | 3/1923 | Varga . |
| 1,786,704 | 12/1930 | Deibele . |
| 1,996,293 | 4/1935 | House . |
| 2,632,280 | 3/1953 | Heim . |
| 3,866,349 | 2/1975 | Meijer et al. ............................. 43/114 |
| 4,217,723 | 8/1980 | Hrebec ..................................... 43/122 |
| 4,360,987 | 11/1982 | Lowder .................................... 43/122 |
| 4,471,563 | 9/1984 | Lindgren .................................. 43/122 |
| 4,581,845 | 4/1986 | Burkholder et al. ..................... 43/107 |
| 4,718,193 | 1/1988 | Rosselli ................................... 43/122 |
| 5,042,194 | 8/1991 | Cohen ...................................... 43/131 |
| 5,142,815 | 9/1992 | Birdsong ................................. 43/113 |
| 5,170,584 | 12/1992 | Perry ....................................... 43/124 |
| 5,239,771 | 8/1993 | Beardsley ............................... 43/119 |
| 5,246,654 | 9/1993 | Ertle et al. ............................. 264/118 |
| 5,339,563 | 8/1994 | Job .......................................... 43/122 |
| 5,447,718 | 9/1995 | Aldrich et al. .......................... 424/84 |
| 5,461,822 | 10/1995 | Green ...................................... 43/122 |
| 5,501,826 | 3/1996 | Ertle et al. ............................. 264/118 |
| 5,596,833 | 1/1997 | Harrie ..................................... 43/122 |
| 5,608,988 | 3/1997 | Dowling et al. ........................ 43/114 |
| 5,953,854 | 9/1999 | Hyatt ...................................... 43/131 |

FOREIGN PATENT DOCUMENTS 0650322  3/1999  European Pat. Off. .

*Primary Examiner*—Jack W. Lavinder
*Attorney, Agent, or Firm*—Philip C. Mendes da Costa; Berskin & Parr

[57] ABSTRACT

A trap for trapping a pest comprises a container having a passage leading to a pitfall, and a medium positioned in the pitfall, the medium being capable of flowing in response to pressure exerted thereon by the pest and being capable of adhering to an exterior surface of the pest which come into contact with the medium whereby the additional weight of the medium restricts the ability of the pest to leave the container.

26 Claims, 2 Drawing Sheets

DEVICE FOR TRAPPING PESTS

FIELD OF THE INVENTION

The present invention relates to a trap for pests and, more particularly, to providing a non-toxic and environmentally friendly device and medium therefor.

BACKGROUND OF THE INVENTION

Animal and insect pests are of constant concern to humankind in terms of competition for resources, posing hazards to health and safety of people, as well as interfering with the enjoyment of property and the environment. Many methods of pest control have been devised which generally involve the use of poisons, pesticides, chemicals, noxious baits, as well as various entrapment substances, such as adhesives and oils or use electrified cages. These prior art methods, however, often pose a threat to the health, safety and/or convenience of their human users, as well as utilize inhumane methods to trap and destroy the pests.

One pest which is often the target of human pest control efforts is the fly *Pollenia Rudis*, commonly known as "Cluster Fly" or "Blow Fly". These insects have bodies which are covered by tiny hairs which aid the fly in various biological tasks. Furthermore, the fly has small hooks or sticky pads on its feet which permit it to walk on, and climb, seemingly smooth vertical and inverted surfaces, such as walls and ceilings. Obviously, the insect is also capable of winged flight.

SUMMARY OF THE INVENTION

The present invention provides a passive means for trapping pests which does not require the use of toxic substances. The present invention also provides a simple and convenient device for trapping and disposal of pests.

In accordance with the present invention, there is provided a trap for trapping a pest comprising:

(a) a container having a passage leading to a pitfall; and, (b) a medium positioned in the pitfall, the medium being capable of flowing in response to pressure exerted thereon by the pest and being capable of adhering to an exterior surface of the pest which come into contact with the medium whereby the medium restricts the ability of the pest to leave the container.

In accordance with another embodiment of the instant invention, there is provided a trap for a pest comprising:

(a) a container having an outer wall, a reservoir and a passage extending from the outer wall to a position above the reservoir; and, (b) a flowable discrete medium for adhering to at least a portion of the pest, the medium positioned in the reservoir with an air space between the top of the medium and the passage, a sufficient amount of the medium adhering to the pest which comes into contact with the medium to restrict the ability of the pest to leave the container.

The passage may be curved, or angled, or of diminishing or expanding dimension or there may be a series of such passages. Further, the pitfall may comprise a reservoir positioned within the container with the medium positioned in the reservoir and an air space is positioned between the top of the medium and the passage. Preferably, the reservoir has sides surrounding the medium in the pitfall and extending upwardly away from the medium. More preferably, the sides are substantially smooth. Alternately, or in addition, several pitfalls may be adjoined to the passage.

The trap may have one or more members interior of the container for substantially obstructing direct access from the medium to the exterior of the container.

The medium may be a dry free flowing powder. Preferably, the powder is hydrophobic. The medium may have a density which is essentially the same as or less than the density of the pest.

The medium may be a member selected from the group consisting of glass microspheres, sodium silicate powder, perlite, expanded perlite, mica, expanded mica, plastic particles, expanded plastic particles, corn starch, baking powder, flour, discrete particles of agricultural fibres, and mixtures thereof. Preferably, the medium is a member selected from the group consisting of glass microspheres, sodium silicate powder and mixtures thereof.

The pest may be a winged insect and the medium adheres to one or more of the hair and the sticky pads of the insect. Preferably, the insect is a fly and the trap is so dimensioned.

An advantage of the instant invention is that the trap uses a discrete medium to physically trap the insect. When the discrete medium physically adheres to the insect, the insect is unable to climb or crawl due to the low coefficient of friction between the medium and the surface of the container (in the case of a non-winged insect) or to fly (in the case of a winged insect) out of the trap. The discrete medium may cause one or more effects on the insect. First, it may weigh the insect down so that it is unable to fly. Alternately, even if a sufficient amount of the discrete medium does not adhere to the insect to prevent it achieving flight, it will tire sooner in its exertion to escape from the discrete medium. This, together with the design of the passage, make it unlikely that the insect will achieve flight for a sufficient amount of time to reach the passage and to navigate through the passage to exit the trap.

Further, when the insect comes into contact with the discrete medium, it may become more erratic in its motion, as if panicked. These more energized movements cause the insect to tire sooner, thereby making it more unlikely that it will have sufficient energy to reach the passage and to navigate through the passage to exit the trap. Further, these more energized motions have a tendency to cause the insect to become buried in the discrete medium.

BRIEF DESCRIPTION OF THE DRAWINGS

For a better understanding of the present invention, and to show more clearly how it may be carried into effect, reference will now be made by way of example to the accompanying drawings which show a preferred embodiment of the present invention, in which.

DETAILED DESCRIPTION OF THE PREFERRED EMBODIMENT

Figure 1:
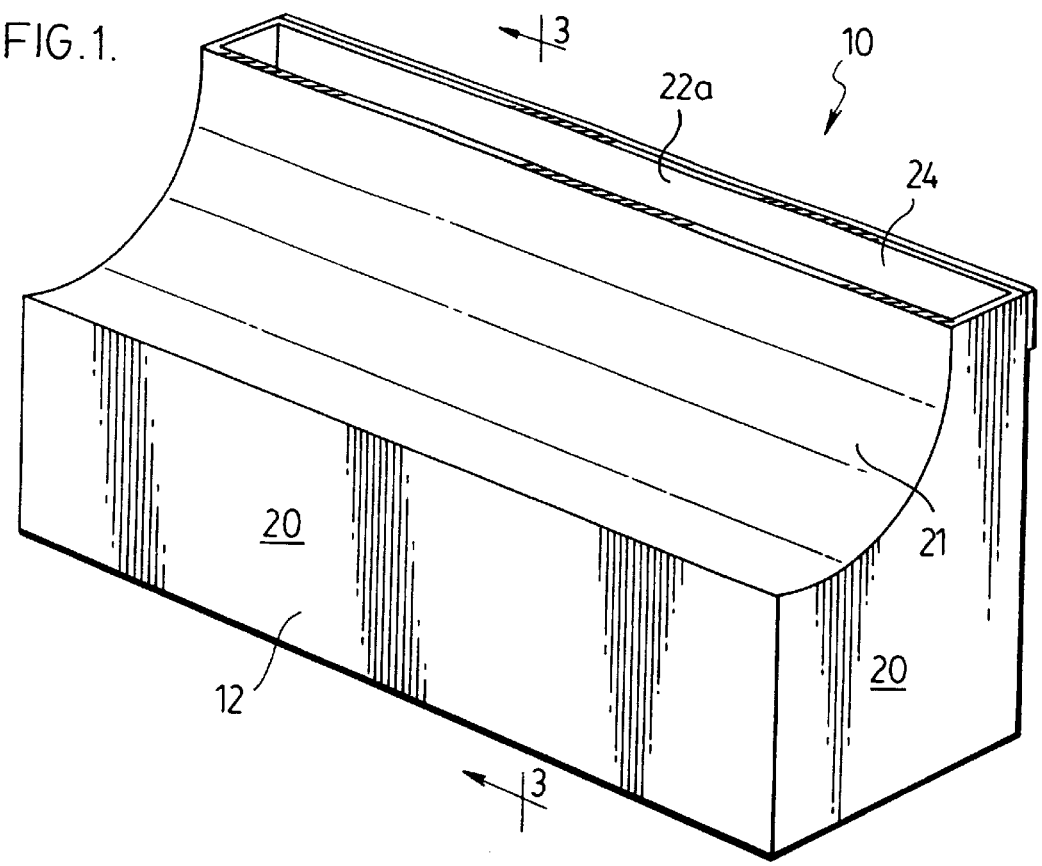
FIG. 1 is a front view of a device according to the present invention.

A pest trap 10 comprises a container or reservoir 30 containing an entrapment medium 14 having a surface 16.

Trap 10 may be of any design known in the art. Preferably, trap 10 is of any design known in the art for catching winged insects. Generally trap 10 includes a pitfall 12 to enhance the ability of trap 10 to catch pests and to impede their escape.

Figure 2:
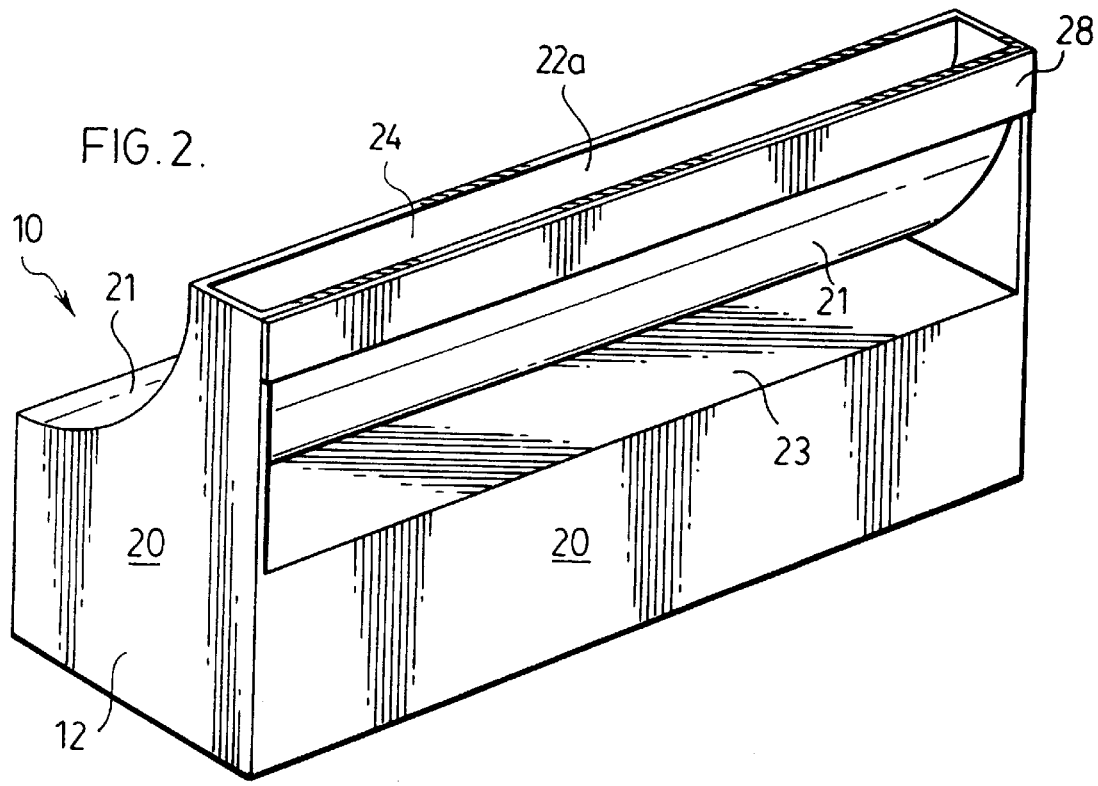
FIG. 2 is a rear view of the trap of FIG. 1.
Figure 3:
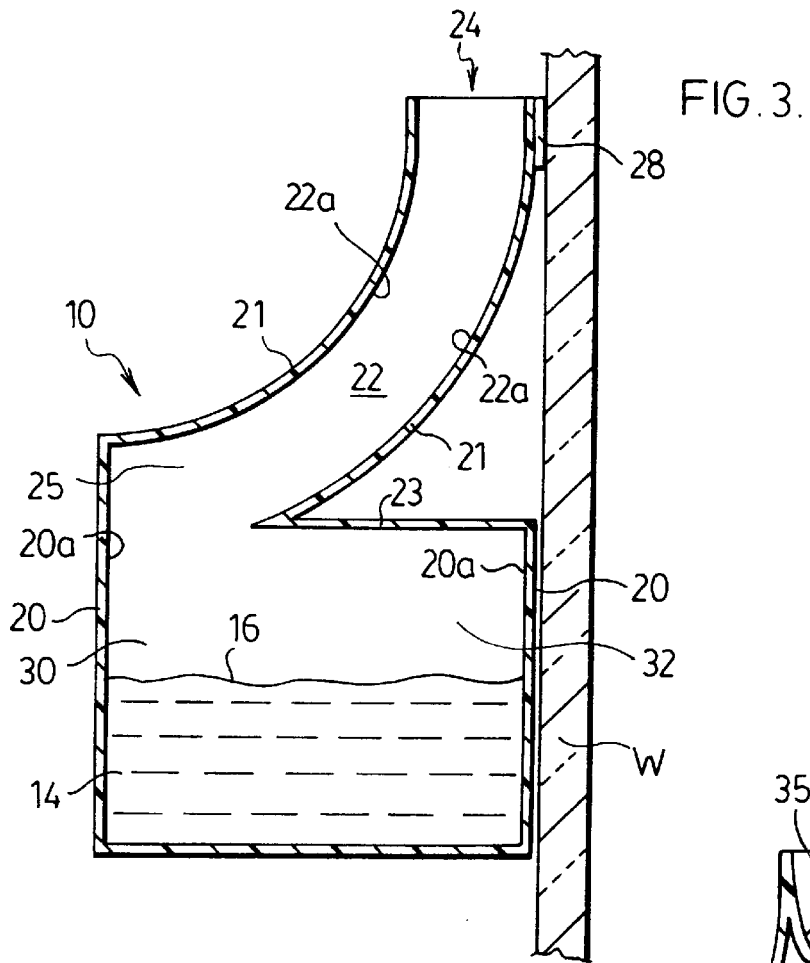
FIG. 3 is a sectional view of the trap of FIG. 1, taken along the line 3—3.

Turning to FIGS. 1, 2 and 3, a preferred pest trap 10 for use with flying pests, such as cluster flies, is shown. Pitfall 12 comprises a container 30, having side walls 20, curved walls 21, top 23, a passage 22 having an entrance 24 and an exit 25. Side walls 20 have an inner surface 20a and passage 22 has walls having inner surface 22a. A self-adhesive strip 28 may be provided for quick and easy mounting of container 30 to a window pane, wall W or other suitable surface.

Container 30 may be made of any material, such as injection moulded or blow moulded plastics. Treated paper, metals and ceramics may also be used.

In the preferred embodiment, container 30 is generally vertically disposed with medium 14 positioned in the lower portion of container 30. An air gap 32 extends from surface 16 to exit 25 of passage 22. Thus, once a pest enters container 30, it may not just walk out. It must either fly or jump to passage 22, or it must walk up walls 22.

Container 30 increases the entrapment ability of pest trap 10 by decreasing the ease with which an insect may walk, jump or fly out of container 30 and away from entrapment medium 14. Inner surfaces 20a and 22a are preferably smooth, thereby making walking vertically up walls 20 or along passage 22 difficult, especially in view of the adherence of entrapment medium 14 to the pest's feet and legs.

Passage 22 preferably extends substantially across the top of trap 10 thus defining a longitudinally extending entrance 24. Passage 22 preferably defines a non-linear path between entrance 24 and exit 25. The path may be curved as shown in FIG. 3. In this Figure, container 30 has a curved walls 21 to prevent a straight-line escape by a pest from the surface of entrapment medium 14. Further, entrance 24 is narrow, and top 23 makes outbound passage through entrance 24 difficult. Although an unencumbered pest may be able to scale walls 20, and/or navigate around passage 22 and out through entrance 24, such tasks become very difficult once the pest has come in contact with entrapment medium 14, as its ability to climb and/or fly becomes considerably decreased by the adhesion of particles to it. Thus, container 30 increases the overall effectiveness of pest trap 10. Further, as pests are trapped and buried in the medium, the effective volume of the medium increases, thus increasing the capacity of the trap to trap and hold additional pests.

Figure 4:
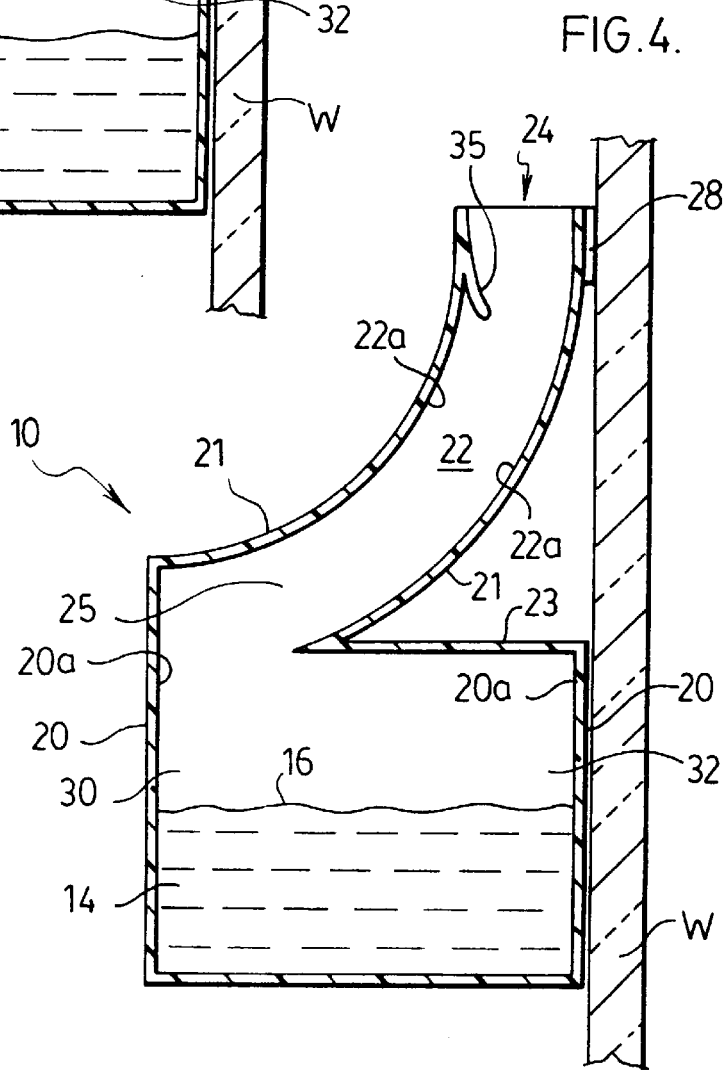
FIG. 4 is a sectional view of an alternate embodiment of the trap of FIG. 1.

As shown in FIG. 4, entrance 24 may have a downwardly depending lip 35 or other protrusion into passage 22 to inhibit egress of a pest from container 30.

Container 30 also has several ancillary advantages, such as impeding spillage of entrapment medium 14 and discouraging access to entrapment medium 14 by children or household pets. Container 30 may also be given an outward appearance which is decorative and pleasing to the eye. Moreover, when pest trap 10 is filled to capacity, or no longer desired, container 10 can be made to be disposable, permitting pest trap 10 to be discarded tidily.

Entrapment medium 14 may be composed of any material that is capable of flowing in response to pressure exerted thereon by the pest and is capable of adhering to an exterior surface of the pest which come into contact with the medium. Accordingly, medium 14 is composed of discrete particles. The particles may be of any geometric shape provided they will adhere to at least a portion of the body of the pest. Preferably, the particles are free flowing. The particles are preferably dry when the trap is first used. Further, in order to ensure the particles retain their usability over the life of the trap, the particles are preferably non-caking or hydrophobic. Alternately, or in addition, a desiccant or lubricant or moisture repellant may be incorporated or combined with the particles to maintain them in a dry or flowable condition.

Particles of entrapment medium 14 may adhere to the pest's body in many ways. For example, particles may utilize electrostatic attraction to adhere to the pest's body. Alternately (or additionally) particles may be sized and shaped to promote mechanical adhesion, such as being trapped and retained by hair, cracks and crevices, or sticky portions on the pests's body. Any manner of adhesion may be used. Preferably, the adhesion is by physical means.

In use, trap 10 may be placed in any location where pest control is desired. This may be near an area of infestation. In the case of a winged insect, and in particular cluster flies, the trap 10 may be advantageously located near the inner surface of an exterior window of a building, a place where flies and other winged insects commonly congregate. Alternately, trap 10 may be used near a habitat or a source of food for the pests such as a field or a food storage area. If trap 10 is used in such an area, then the amount and type of pesticides may be reduced or eliminated.

Eventually, a pest will enter trap 10 via entrance 24 and will travel along passage 22 to exit 25. Once in air gap 32, the pest will tend to come in contact with surface 16 of entrapment medium 14. Once in contact with medium 14, particles of medium 14 begin to adhere to the pest. As the pest moves around on surface 16, particles increasingly cover the pest's body. The adherence of entrapment medium 14 to the pest's body acts to trap the pest in one or more ways: (1) the additional mass adhered to the pest's body increases the weight of the subject pest, impeding walking and/or flying; (2) the presence of particles on the exterior of the pest's body decreases the range of motion of its limbs and wings further inhibiting walking and/or flying and/or distracts and disorients the pest thus making it more unlikely the pest will be able to attain passage 22 and navigate therethrough; and (3) the adherence of particles to, and around, vital parts of the pest's body, such as its mouth and, in the case of an insect, its breathing spiracles (located on the insect's abdomen), inhibits and may ultimately suppress critical biological functions such as breathing.

Furthermore, the free-flowing and non-caking nature of entrapment medium 14 may result in a progressive burying of the pest in the mass of entrapment medium 14 in pitfall 12. As the pest struggles to walk across surface 16 or to take flight, the relatively low friction generally between adjacent particles causes particles around the locations of the pest's feet to be redistributed away from the foot when the pest exerts pressure thereon. This results in the pest's foot gradually sinking into the mass of entrapment medium 14. This burying action is amplified by movement. Thus, the more a pest struggles, the further it may be buried. Advantageously, as well, as the particles redistribute in response to the pest's attempts at motion, there is opportunity for increased adherence of particles to the pest, further ensnaring the pest in trap 10.

Pitfall 12 is provided to further prevent escape from trap 10. Any pest which does manage to move to the edge of entrapment medium 14, must then also scale inner surfaces 20a and 22a or fly through air gap 32 and passage 22 before escape from trap 10 can be achieved. Preferably, inner surfaces 20a and 22a are smooth so as not to provide any purchase for the pest. The adherence of particles to the pads of the feet of the pest may also increase the difficulty of scaling side walls 20.

If entrapment medium 14 is a dry powder-like material, a wicking effect will result which acts to draw moisture out of the pest's body and into medium 14. This may dehydrate the pest and may further weaken the pest and reduce its ability to escape from trap 10. When pest 10 ultimately dies, this property of entrapment medium 14 has the additional advantage of drying out the pest's carcass to reduce the unpleasant effects associated with decay of the carcass.

There are many possible materials having the properties described above which may be used advantageously as entrapment medium 14. It has been found that an entrapment medium 14 comprising hollow glass microspheres, such as those with a density ranging from 0.125 to 0.6 g/cm³ and a particle size ranging from 30 to 350 microns, are particularly suitable, although glass microspheres outside these size and density ranges will also be effective. This choice of entrapment medium 14 is particularly well suited for both adherence to the tiny hairs which coat the body of an insect pest such as a cluster fly, and providing a free-flowing, non-caking medium 14. Furthermore, the moisture level of such glass microspheres is sufficiently low to promote the drying effect on the pest described above.

A variety of alternate materials have also been found to be suitable, such as alkali metal silicate-based particles (as are described in U.S. Pat. Nos. 5,246,654 and 5,501,826 to Ertle et al.), as well as materials more commonly available such as cornstarch, baking soda, flour, or finely ground corncob fraction. Yet other materials having the properties described above will be suitable, glass microspheres, sodium silicate powder, perlite, expanded perlite, mica, expanded mica, plastic particles, expanded plastic particles, corn starch, baking powder, flour, discrete particles of agricultural fibres (eg. ground corncob), and mixtures thereof. The characteristics to consider in choosing a material entrapment medium 14 is its ability to adhere to the pest or to otherwise interfere with the biological functions (especially breathing) of the pest and the extent of its ability to be free-flowing and free from caking. These two properties may act independently or together in entrapment medium 14 to ensnare a pest. Depending on the pest, different materials may be required, or additives to a particular material may be required. The particle size of the discrete medium may be larger for larger pests.

The above-mentioned materials are particularly suitable for use with an insect such as a cluster fly. Other insect pests, however, such as earwigs, have less hair on its body, which disadvantageously results in less adherence of the mentioned materials to the pest's body. To promote increased adherence of entrapment medium 14 to the pest, without unduly reducing the free-flowing nature of the material, it has been found to be desirable to add a fumed silicate such as the thixotrop additive AEROSIL 200 (a trademark of Degussa Corporation) in amounts to entrapment medium 14, as desired. The fumed silicate may be blended with, or entirely comprise, medium 14. The fumed silicate increases both the ability of entrapment medium 14 to adhere to the insect, as well as promoting dehydration of the insect.

When entrapment media 14 such as cornstarch, baking soda, flour or ground corn cob are used, it is preferable to add a desiccant to ensure that entrapment medium 14 does not absorb environmental moisture, thereby negatively affecting properties of entrapment medium 14. In general, increased moisture content in these materials will result in increased caking in the material, reducing its ability to be free-flowing. Thus a desiccant is desired.

Additives may be also be added to entrapment medium 14, or incorporated elsewhere within trap 10, to achieve various results. For example, an attractant, such as a pheromone lure (eg. as are described in U.S. Pat. No. 5,447,718 to Aldrich et al or 3,866,349 to Meijer et al.) or other bait (eg. sugar, salt or light), may be added to increase the number of pest strikes on entrapment medium 14. Also, if desired, a toxin, such as diazinon, piperonyl butoxide, pyrethrin, permethrin, d-trans allethrin, n-octyl bicycloheptane dicarboximide, resmethrin, chlorpyrifos (Dursban), propoxur (Baygon) or other suitable toxin or poison known in the art, may be added to entrapment medium 14. Also, it has been found that diatomaceous earth added in small amounts to entrapment medium 14 increases the disabling effect of pest trap 10.

It will be understood by one skilled in the art that the pest trap according to the present invention may be used with a variety of different pests. For example, an appropriate entrapment media 14 and pitfall 12 may be designed, using the considerations discussed herein, to make a pest trap 10 for use with other common pests, such as mice, cockroaches and the like. The choice of a particular material for use as entrapment medium 14 will be affected by its ability to both adhere to the target pest and/or to supress its biological functions (especially breathing), as well as be free-flowing in response to the pest's weight exerted on the surface 16 of entrapment media 14. Preferably, medium 14 has a density which is the same as or less than the weight of the target pest.

The pest trap, according to the present invention, has several advantages over the prior art. First and foremost, is that the use of highly toxic material is minimized or in fact may not be needed, thereby creating a trap which is both safer to humans and to the environment. Secondly, the complete disabling effect of entrapment medium 14 quickly suppresses all motive functions of the trapped pest, reducing annoyances, such as the futile buzzing of a fly's wings which is encountered with sticky tape-type pest traps. Furthermore, the trap of the present invention does not require a complex mechanical baffle system, as shown in prior art non-toxic pest traps. Also, the present invention is simple to construct, and the dry medium is not subject to evaporation over time.

Trap 10 has been described above in relation to indoor uses of the present invention. The present invention may also be used advantageously in outdoor applications. As will be apparent, however, certain modifications may be required. For example, the provision of a rain shield to exclude rainfall from the trap may be desired. Alternately, flotation means could be added to accommodate waterborne applications. Furthermore, certain repellents may be used to discourage entry by non-targeted creatures, such as pollinating insects. In a further alternate embodiment, trap 10 may be placed in the travel path of insects. In such a case passage 22 need not be circuitous as trap 10 may be positioned so that the pest travels directly into the trap so as to contact the medium.

It is to be understood that what has been described is a preferred embodiment to the invention. The invention nonetheless is susceptible to certain changes and alternative embodiments fully comprehended by the spirit of the invention as described above, and the scope of the claims set out below.

I claim:

1. A trap for trapping a pest comprising:
 (a) a container having a passage leading to a pitfall; and
 (b) a mass of dry free flowing medium positioned in the pitfall, the medium being capable of flowing in response to pressure exerted thereon by the pest and being capable of adhering to an exterior surface of the pest which comes into contact with the medium, the medium is composed of particles which are substantially spherical in shape and having a depth sufficient to at least partially bury the pest.

2. The trap as claimed in claim 1 wherein the passage is curved.

3. The trap as claimed in claim 1, wherein the pitfall comprises a reservoir positioned within the container, the medium is positioned in the reservoir, and an air space is positioned between the top of the medium and the passage.

4. The trap as claimed in claim 3, wherein the reservoir has sides surrounding the medium in the pitfall and extending upwardly away from the medium.

5. The trap as claimed in claim 4, wherein the sides are substantially smooth.

6. The trap as claimed in claim 1, further comprising a member interior of the container for substantially obstructing direct access from the medium to the exterior of the container.

7. The trap as claimed in claim 1 wherein the medium is hydrophobic.

8. The trap as claimed in claim 1 wherein the medium has a density which is essentially the same as or less than the density of the pest.

9. The trap as claimed in claim 1 wherein the medium is a member selected from the group consisting of glass microspheres, alkali metal silicate-based particles, fumed silicate particles, sodium silicate powder, perlite, expanded perlite, mica, expanded mica, plastic particles, expanded plastic particles, corn starch, baking powder, flour, discrete particles of agricultural fibres, and mixtures thereof.

10. The trap as claimed in claim 1 wherein the medium is a member selected from the group consisting of glass microspheres, sodium silicate powder and mixtures thereof.

11. The trap as claimed in claim 1 wherein the pest is a winged insect and the medium adheres to one or more of the hair and the sticky pads of the insect.

12. A trap for trapping a pest comprising:

(a) a container having an outer wall, a reservoir and a passage extending from the outer wall to a position above the reservoir; and (b) a mass of flowable dry medium positioned in the reservoir with an air space between the top of the medium and the passage, the medium having a depth sufficient for burying the pest in response to movement of the pest in the trap.

13. The trap as claimed in claim 12 wherein the medium is hydrophobic.

14. The trap as claimed in claim 12 wherein the medium has a density which is essentially the same as or less than the density of the pest.

15. The trap as claimed in claim 12 wherein the medium is a member selected from the group consisting of glass microspheres, alkali metal silicate-based particles, fumed silicate particles, sodium silicate powder, perlite, expanded perlite, mica, expanded mica, plastic particles, expanded plastic particles, corn starch, baking powder, flour, discrete particles of agricultural fibres, and mixtures thereof.

16. The trap as claimed in claim 12 wherein the medium is a member selected from the group consisting of glass microspheres, sodium silicate powder and mixtures thereof.

17. The trap as claimed in claim 12 wherein the pest is a winged insect and the medium adheres to one or more of the hair and the sticky pads of the insect.

18. The trap as claimed in claim 12 further comprising a member interior of the container for substantially obstructing direct access from the medium to the exterior of the container.

19. A trap for trapping a pest comprising:

(a) a container having a passage leading to a pitfall; and (b) a mass of dry medium positioned in the pitfall and having a depth sufficient to bury the pest, the medium being composed of particles shaped so as to be freely flowing in response to pressure exerted thereon by the pest.

20. The trap as claimed in claim 19 wherein the pitfall comprises a reservoir positioned within the container, the medium is positioned in the reservoir, and an air space is positioned between the top of the medium and the passage.

21. The trap as claimed in claim 20 wherein the reservoir has sides surrounding the medium in the pitfall and extending upwardly away from the medium.

22. The trap as claimed in claim 21 wherein the sides are substantially smooth.

23. The trap as claimed in claim 19 further comprising a member interior of the container for substantially obstructing direct access from the medium to the exterior of the container.

24. The trap as claimed in claim 19 wherein the medium is hydrophobic.

25. The trap as claimed in claim 19 wherein the medium has a density which is essentially the same as or less than the density of the pest and is composed of particles which are substantially spherical in shape.

26. The trap as claimed in claim 19 wherein the medium is a member selected from the group consisting of glass microspheres, alkali metal silicate-based particles, fumed silicate particles, sodium silicate powder, perlite, expanded perlite, mica, expanded mica, plastic particles, expanded plastic particles, corn starch, baking powder, flour, discrete particles of agricultural fibres, and mixtures thereof.

* * * * *